US008024852B1

(12) United States Patent  
Hurst et al.

(10) Patent No.: US 8,024,852 B1  
(45) Date of Patent: Sep. 27, 2011

(54) BAR MOUNTED TOOL ADAPTOR

(75) Inventors: Rick Hurst, Rochester Hills, MI (US);  
Corey Chappus, Armada, MI (US);  
Bryan Voss, Warren, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 0 days.

(21) Appl. No.: 12/823,385

(22) Filed: Jun. 25, 2010

Related U.S. Application Data

(63) Continuation of application No. 11/248,074, filed on Oct. 12, 2005, now Pat. No. 7,748,107.

(60) Provisional application No. 60/617,969, filed on Oct. 12, 2004.

(51) Int. Cl.  
*B23P 21/00* (2006.01)  
*B65G 1/133* (2006.01)

(52) U.S. Cl. ...................................... 29/721; 414/752.1

(58) Field of Classification Search ............. 29/469, 29/559, 721, 700, 281.1, 281.4, 281.5, 281.6, 29/283, 743; 414/752.1, 749, 749.1, 751.1; 294/65; 901/16  
See application file for complete search history.

(56) References Cited

U.S. PATENT DOCUMENTS

| 5,733,097 A | 3/1998 | Herbermann et al. |
| 5,746,567 A | 5/1998 | Herbermann et al. |
| 5,909,998 A | 6/1999 | Herbermann et al. |
| 6,190,395 B1 | 2/2001 | Williams |
| 6,244,814 B1 | 6/2001 | Herbermann et al. |

*Primary Examiner* — John C Hong  
(74) *Attorney, Agent, or Firm* — Young Basile Hanlon & MacFarlane, P.C.

(57) ABSTRACT

A tool mount assembly includes drop down connections to aid in mounting of a tool to a moving base and a fail-safe tool mounting system for preventing installation of a tool in an undesired or incorrect manner. A plurality of tool mount rails are received within mounts and are uniquely tailored to assure proper placement of tools such as grippers or vacuum cups at desired locations specific to the application requirements.

20 Claims, 3 Drawing Sheets

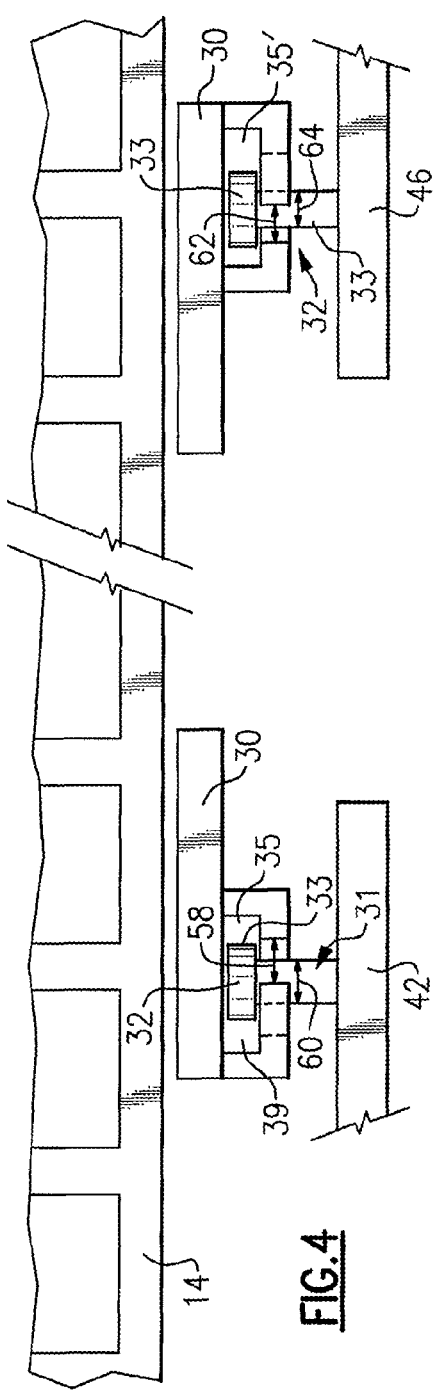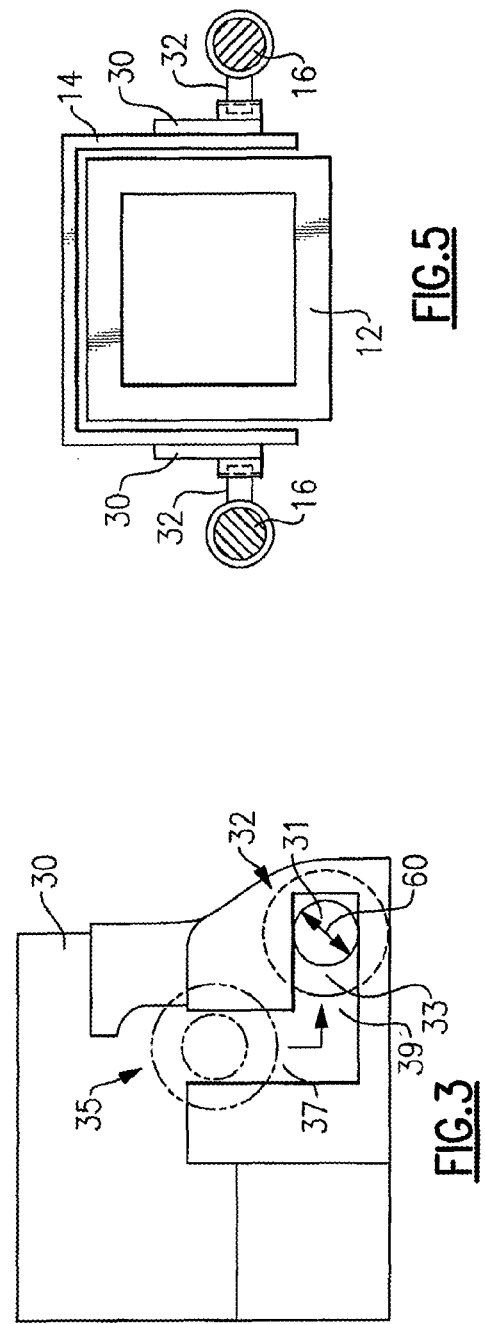

BAR MOUNTED TOOL ADAPTOR

REFERENCE TO RELATED APPLICATIONS

The application is a continuation application of U.S. patent application Ser. No. 11/248,074, which issued as U.S. Pat. No. 7,748,107 and which claims the priority of U.S. Provisional Application No. 60/617,969, filed on Oct. 12, 2004.

BACKGROUND OF THE INVENTION

This invention generally relates to a tool mounting system for a workpiece transfer system. More particularly, this invention relates to a tool mounting system mountable to a workpiece transfer system.

A workpiece transfer system includes a bar that moves a workpiece between desired locations. Often the workpiece transfer system will move body panels between stamping stations. Tools such as grippers or vacuum cups are attached to the bar and grasp a workpiece at one location and release the workpiece at another location. The tools often utilize pressurized air for actuation and therefore need numerous pneumatic couplings and conduits that are attached to the bar.

In many applications of workpiece transfer systems, the clearance between the bar and the stamping station is limited. Accordingly, each part must fit within certain defined space restrictions. This includes the pneumatic and electrical wires that supply and control actuation of the gripper and vacuum tools.

Further, it is often the case with many transfer systems that multiple workpiece configurations are fabricated within the same line. The stamping dies are changed over along with the tooling required to move the workpieces between stations. Rigidly attached tooling makes change over difficult and time consuming.

Accordingly, it is desirable to design a transfer system that provides for switching of tooling while remaining within the space limitations of the transfer system.

SUMMARY OF THE INVENTION

A tool mounting system of the present invention has a base and at least one pair of first releasable mounting portions connected to said base. At least one tool mounting structure has at least one pair of second releasable mounting portions connected thereto. The first releasable mounting portions are connected to the second releasable mounting portions to releasably connect the at least one tool mounting structure to the base. The base may comprise a bar or an adaptor connectable to a bar.

Each one of the at least one pair of first releasable mounting portions are spaced apart from one another at a predetermined axial distance on said base. Each one of the at least one pair of second releasable mounting portions is spaced apart from one another at the same predetermined axial distance on said tool mounting structures as said first releasable mounting portions so that only the first and second releasable mounting portions spaced at the same distance can be releasably connected.

The at least one pair of first releasable mounting portions have a mount connector and a lug mount connected to the base. The at least one pair of second releasable mounting portions have a mount plug and a lug connected to the tool mounting structure. The mounting connector releasably engages the mount plug, and the lug mount releasably engages the lug for releasably connecting the tool mounting structure to the base. The mount connector and the lug mount of each pair of first releasable mounting portions is spaced at a predetermined axial distance on said base. The mount plug and the lug are spaced a similar axial distance on the tool mounting structure so that only a desired tool mounting structure can be releasably connected to the base.

Each of the lug mounts has a slot with a predetermined width. Each lug has a stem portion having a similarly dimensioned diameter as the width of the slot so that only a desired tool mounting structure can be releasably connected to the base.

The lug mount and the lug of each first and second releasable mounting portions are shaded a similar color to properly identify the tool mounting structure to be connected to the base.

These and other features of the present invention can be best understood from the following specification and drawings, the following of which is a brief description.

BRIEF DESCRIPTION OF THE DRAWINGS

FIG. 3 is a schematic view of an example lug mount according to this invention.

FIG. 4 is a top schematic view of example drop down lug mounts according to this invention.

FIG. 5 is a cross-sectional view of the example tool mounting system.

DETAILED DESCRIPTION OF THE PREFERRED EMBODIMENT

Figure 1:
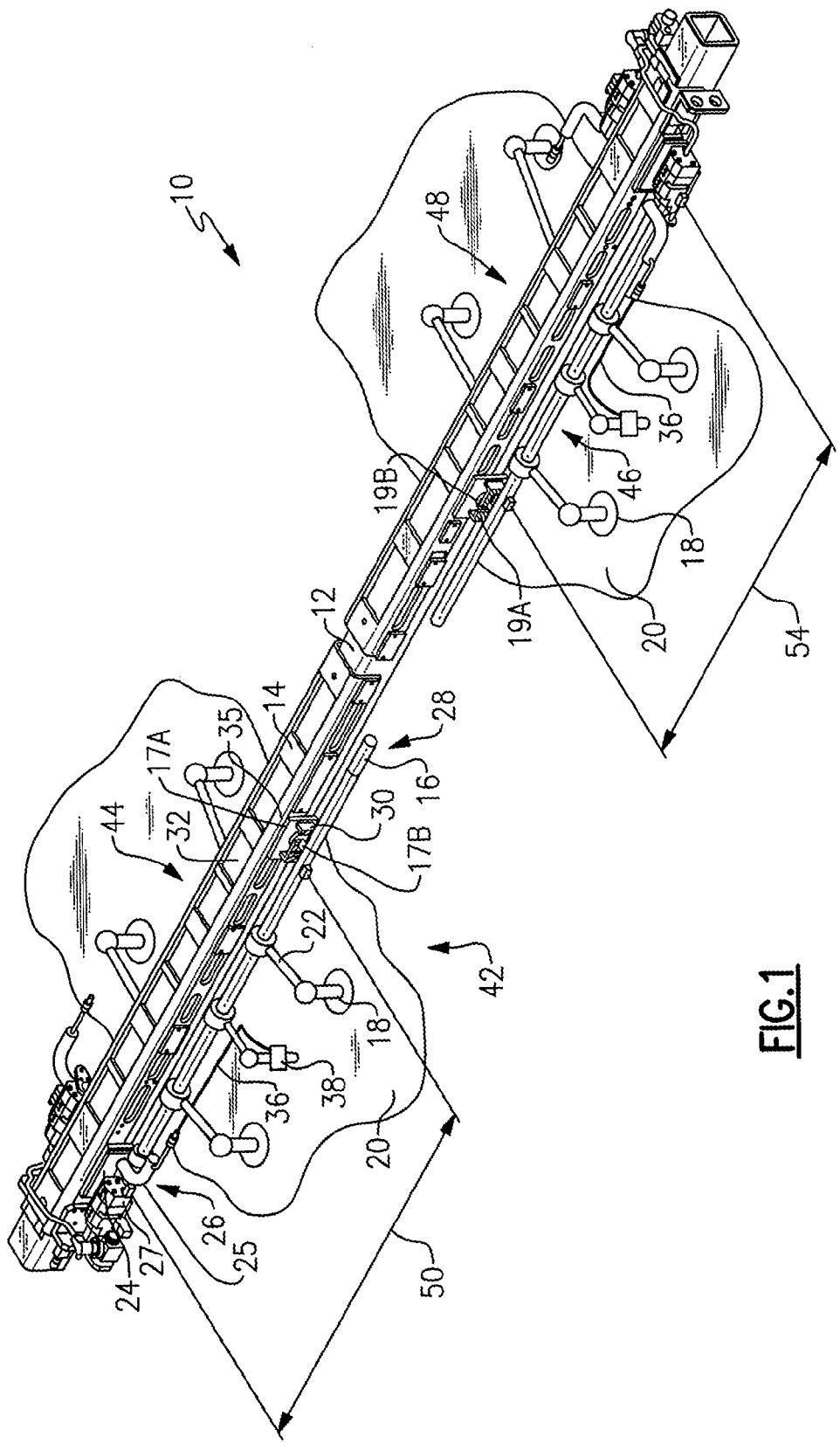
FIG. 1 is a perspective view of an example bar tool mounting system according to this invention.

Referring to FIG. 1, workpiece transfer system 10 includes a bar 12 that moves a workpiece 20 between workstations (not shown). An adaptor 14 is attached to the bar 12 and supports the tools 18. The tools 18 extend from removable rails 16 attached to the adaptor 14. The tools 18 illustrated are pneumatically actuated suction cups. However, other tools as are known would also benefit from the disclosures of this invention, for example mechanical grippers and part present sending devices.

The rail 16 is part of a rail assembly. There are four rail assemblies 42, 44, 46 and 48 illustrated. The tools 18 are mounted to arms 22 that are in turn mounted to the rail 16 of each rail assembly 42, 44, 46 and 48. The position of the tools 18 along the rail 16 is infinitely adjustable such that the configuration and placement of the tools 18 can be tailored to the requirements of a specific application and workpiece 20.

Each of the rail assemblies 42, 44, 46 and 48 include a mount plug 25 that is attachable to a selectively releasable mount connector 24 attached to the adaptor 14. The mount plug 25 is affixed to a first end of the rail 16 for each of the rail assemblies 42, 44, 46 and 48. The mount plug 25 interfaces with the mount connector 24 to communicate pressurized air and provide an electrical connection for any electrical devices mounted to the rail 16. The mount connector 24 includes a locking device 27 movable between a released position where the rail 16 may be removed and a secured position where the rail 16 is rigidly held into the mount connector 24, and the desired electrical and pneumatic connections are completed.

The example rail assembly 42 includes a sensor 38 for detecting the presence of the workpiece 20. The sensor 38 is electrically attached through the interface between the mount plug 25 and the mount connector 24. The mount connector 24 is in turn in communication with a source of electrical energy and pressurized air. Further, the mount connector 24 is adaptable for providing communication of control signals to the tools 18 mounted to the rail 16.

The mount connector 24 also provides support of an end of the rail 16. The second end 28 of the rail 16 is supported by a lug 32 that fits within a lug mount 30. The lug 32 on the rail 16 is first placed within the lug mount 30 and slid axially into full engagement with the mount connector 24. The lug mount 30 receives the lug 32 within a slot 35 that includes a vertical portion 37 and horizontal portion 39. The lug 32 drops within the vertical portion 37 of the slot 35 and is slid axially within the horizontal portion 39 of the slot to facilitate axial engagement and securement of the mount plug 25 within the mount connector 24. Although a mount connector 24 and mount plug 25 are illustrated, it is within the contemplation of this invention to utilize other mounting devices that are known in the art.

The rail assemblies 42, 44, 46 and 48 are installed to the adaptor 14 in a specific location. Each of the rail assemblies 42, 44, 46 and 48 are adapted to fit only one location to ensure a desired orientation of the rail assemblies 42, 44, 46 and 48 to comply with application specific requirements. Each of the rail assemblies 42, 44, 46 and 48 are identified by a color code. The color of the lug 32 corresponds to a color on the lug mount 30 to provide a determination of the correct position for mounting of the rail assembly.

The color code in the illustrated example is green for the rail assembly 42 and is indicated schematically by shading 17B on the rail assembly 42 and shading 17A on the lug mount 30. The rail assembly 46 includes a gold color code schematically indicated at 19A on the rail 16 and a matching gold color indicated at 19B on the lug mount 30. The rail assembly 44 includes a silver color code (not shown) and the rail assembly 46 includes a black color code (not shown). The color-codes 17A and 19A disposed on the rail 16 of each rail assembly 42, 46 comprise a colored tape. The color-codes 17B and 19B on the lug mounts 30 are provided by a desired plating color. As appreciated, other colors and method of adhering that color to the lug mount and the rail may be utilized to identify each position on the adaptor 14 with the corresponding one of the rail assemblies 42, 44, 46 and 48. The different color codes provide for easy identification of the proper location for the rail assembly.

Figure 2:
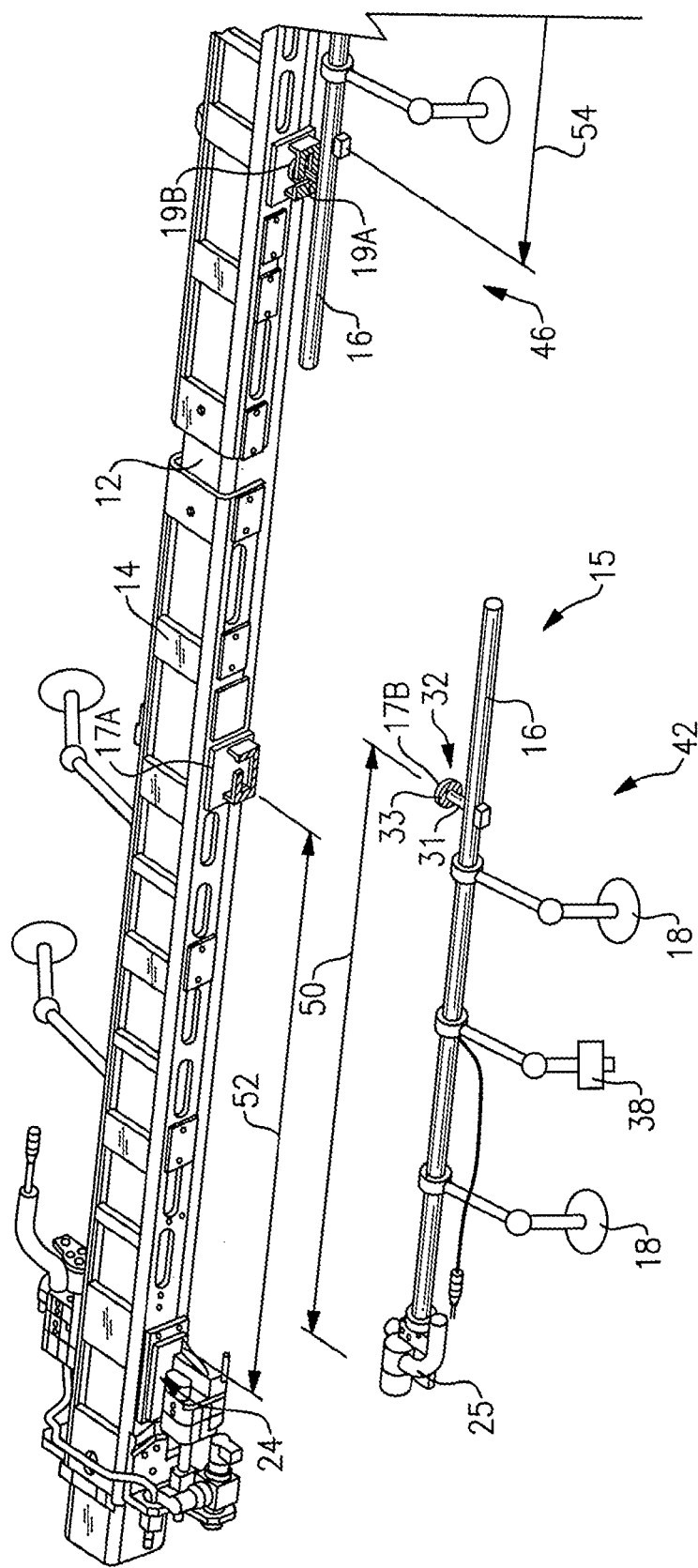
FIG. 2 is another perspective view of the example bar tool mounting system with a rail removed.

Referring to FIG. 2, the rail assembly 42 is illustrated removed from the rail adaptor 14. The rail assembly 42, like the other rail assemblies 44, 46 and 48, includes a length 50 between the lug 32 and a portion of the mount plug 25. The length 50 for each of the rail assemblies in unique such that one rail assembly cannot be assembled into the place of another rail assembly. In the example illustrated in FIG. 2, the rail assembly 46 includes a length 54 that is different than the length 50 such that the rail assembly 46 cannot be assembled in place of the rail assembly 42. The length 50 between the lug 32 and the end of the mount plug 25 corresponds to a length 52 between the mount connector 24 and the lug mount 30. The length 52 is measured from a stop of the mount connector 24 and a position within the horizontal portion 39 of the slot 35 within the lug mount 30.

The length 50 between the lug 32 and the end of the mount plug 25 is a dimension that is fabricated within desired tolerances to provide the desired fit once mounted. As appreciated, some prior art tool mounting devices include multiple critical dimensions that must be closely controlled to provide the desired fit or event to allow assembly. The instant tool mounting system includes only a single closely held dimension, thereby simplifying assembly and fabrication.

The rail assembly 42 is easily removable by unlocking the mount plug 25 from the mount connector 24 and moving the entire rail axially away from the mount plug 25 until the lug 32 is free to move vertically within the slot 35 of the lug mount 30. Another rail assembly including tooling for a differently shaped and configured workpiece can then be installed to provide a relatively quick and easy tooling change over.

In operation, several sets of rail assemblies will be provided that correspond to various and differently configured workpieces. Change over is conducted by removing one set of color-coded rail assemblies and installing another set in the proper color code locations. Rail assemblies can only be properly installed into corresponding locations due to the different lengths 50 and 54 between the mount connector 24 and the lug mount 30.

Referring to FIG. 3, the lug mount 30 is shown without the rail and adaptor for clarity. The lug mount 30 includes the slot 35 having the vertical portion 37 and the horizontal portion 39. The drop down feature provided by the lug 32 being received in the slot 35 facilitates quick assembly of a rail assembly. The lug 32 includes a bushing 33 that supports the tool and prevents twisting during installation. The drop down feature thereby prevents twisting of the rail assembly during assembly, thereby substantially eliminating the need for an assembler to support the rail assembly during the entire assembly process.

Referring to FIG. 4, the lug mount 30 is shown schematically that corresponds to mounting arrangements for the rail assembly 42 and the rail assembly 46. The slot 35 includes a width 58 for the lug 32. The lug 32 includes the bushing 33 supported on a shaft 31. The shaft 31 includes a diameter 60 that corresponds with the width 58 that provides for assembly of the lug 32 within the slot 35. The width 58 is tailored to each of the rail assemblies 42, 44, 46 and 48 such that each of the rail assemblies 42, 44, 46 and 48 includes a tailored width 58 unique to that particular rail assembly.

Accordingly, the rail assembly 46 is partially shown with the lug 32 having a shaft 31 of a diameter 64 different than the diameter 60 for the rail assembly 42. The lug mount 30 for the rail assembly 46 includes a width 62 of the slot 35' that prevents another rail assembly, such as, for example, the rail assembly 42 from being installed within the lug mount 30 instead of the rail assembly 46. Accordingly, the different diameters for each shaft 31 of each of the rail assemblies 42, 44, 46 and 48 substantially prevent assembly of a rail assembly in a non-desired orientation.

Referring to FIG. 5, a cross-section of the transfer system 10 is shown with the adaptor 14 attached to the bar 12. As appreciated, the transfer system 10 operates within a space-restricted environment. In some applications, it is desired to limit or eliminate mounting of devices or objects to the top of the bar 12. Such applications may not allow the mounting of electrical wire harnesses and airlines to the top surface of the bar 12. In such applications, the instant adaptor 14 provides the necessary mounting and communication of air and electric to the tooling without extending substantially beyond the top surface of the bar 12. The addition of the adaptor 14 adds only the minimal thickness of the adaptor 14 to the overall height of the bar 12.

Accordingly, the inventive workpiece transfer system 10 includes several features that assure proper configuration of the several rail assemblies 42, 44, 46 and 48 that expedite and facilitate quick tool changeover. Different lengths between mounting points for each rail assembly and tailored diameters of shafts for each lug accompanied by color-coded parts provides for fail safe and efficient tool change over. Further, the drop down mounting provided by the lug and lug mount configuration eases mounting by eliminating awkward and difficult maneuvering of the rail assemblies during the mounting process.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tool mounting system, comprising:
   a base;
   a plurality of mount pairs connected to said base, each mount pair including a first mount and a second mount that are attached to the base a distance from each other; and
   a plurality of tool mounting structures each having a first mounting portion connectable to said first mount of a corresponding mount pair of said plurality of mount pairs and a second portion connectable to said second mount of the corresponding mount pair of said plurality of mount pairs, wherein each of said plurality of tool mounting structures includes a mating characteristic corresponding to only one of said plurality of mount pairs.

2. The tool mounting system stated in claim 1, wherein said base further comprises:
   a bar.

3. The tool mounting system stated in claim 1, wherein said base further comprises:
   an adaptor connectable to a bar, wherein said mount pairs are connected to said bar by said adaptor.

4. The tool mounting system stated in claim 1, further comprising:
   said first mount and said second mount of each spaced apart from one another at a predetermined axial distance on said base; and
   each one of said pair of second releasable mounting portions spaced apart from one another at said predetermined axial distance on each of said tool mounting structures such that only said at least first and second releasable mounting portions being spaced at said predetermined axial distance can be releasably connected together.

5. The tool mounting system stated in claim 1, further comprising:
   said at least one pair of first releasable mounting portions having a mount connector and a lug mount connected to said base;
   said at least one pair of second releasable mounting portions having a mount plug and a lug connected to said tool mounting structure; and
   said mounting connector releasably engaging said mount plug, and said lug mount releasably engaging said lug for releasably connecting said tool mounting structure to said base.

6. The tool mounting system stated in claim 5, further comprising:
   said mount connector and said lug mount of each of said at least one pair of releasable mounting portions being spaced from one another at said predetermined axial distance along said base;
   said mount plug and said lug of each of said at least one pair of second releasable mounting portions being spaced from one another at said predetermined axial distance along said tool mounting structure so that only certain of said tooling mounting structures can be releasably connected to said base.

7. The tool mounting system stated in claim 5, further comprising:
   each of said lug mounts having a slot formed therein wherein each of said slots has a different predetermined width;
   each of said lugs having a stem portion wherein each stem portion has a different predetermined diameter corresponding to said different predetermined width of said slot in said lug mounts; and
   said stem portion of said lugs releasably received by said slots in said lug mounts wherein said diameter of said stem portion of said lugs and said width of said slot of said lug mounts have corresponding dimensions such that only corresponding pairs of said first and second releasable mounting portions can be releasably connected together.

8. The tool mounting system stated in claim 5, further comprising:
   said lug mount and said lug being shaded a similar color such that said similarly shaded lug mount and lug of said first and second releasable mount portions are identified to be releasably connected together.

9. A tool mounting system, comprising:
   a base;
   at least one mount connector connected to said base and releasably connectable to a mount plug of a tool mounting structure;
   at least one lug mount connected to said base independent from said at least one mount connector and releasably connectable to a lug of said tool mounting structure, wherein said at least one mount connector and said at least one lug mount releasably connect said tool mounting structure to said base.

10. The tool mounting system stated in claim 9, wherein said base further comprises:
    a bar.

11. The tool mounting system stated in claim 9, wherein said base further comprises:
    an adaptor connectable to a bar.

12. The tool mounting system stated in claim 9, further comprising:
    each of said at least one lug mount shaded a different predetermined color and releasably engageable with a lug on said tooling mounting structure having a similar shade of color so as to identify the proper tooling mounting structure to be releasably connected to said base.

13. The tool mounting system stated in claim 9, further comprising:
    a locking device connected to said base for releasably locking said mount plug to said mount connector.

14. A tool mounting system, comprising:
    a base:
    at least one mount connector connected to said base and releasably connectable to a mount plug of a tool mounting structure;
    at least one lug mount connected to said base independent and linearly spaced from said at least one mount connector and releasably connectable to a lug of said tool mounting structure, wherein said at least one mount connector and said at least one lug mount releasably connect said tool mounting structure to said base;
    each of said at least one mount connector and said at least one lug being paired with one another; and each pair of said at least one mount connector and said at least one lug spaced at different predetermined axial distances from one another along said base such that only certain of said tooling mounting structures can be releasably connected to said base.

15. A tool mounting system, comprising:
a base;
at least one mount connector connected to said base and releasably connectable to a mount plug of a tool mounting structure;
at least one lug mount connected to said base independent and linearly spaced from said at least one mount connector and releasably connectable to a lug of said tool mounting structure, wherein said at least one mount connector and said at least one lug mount releasably connect said tool mounting structure to said base; and
each of said at least one lug mount having a slot formed therein wherein each of said slots has a different predetermined width releasably engageable with a diameter of a stem portion of said lug, wherein said diameter of said stem is similar in size to said width of said slot so that only certain said tooling mounting structures can be releasably connected to said base.

16. A tool mounting system, comprising:
a base;
a plurality of mount pairs connected to said base, each mount pair including a mount connector and a lug mount that are attached to the base a distance from each other, the lug mount including a substantially planar member having a slot formed therethrough;
at least one tool mounting structure releasably connectable to at least one tool, each tool mounting structure corresponding to a mount pair of the plurality of mount pairs;
a mount plug connected to each of said at least one tool mounting structure and releasably connectable to said mount connector of a corresponding mount pair of said plurality of mount pairs;
a lug connected to each of said at least one tool mounting structure and releasably connectable to said lug mount of a corresponding mount pair such that said at least one tool mounting structure is releasably connectable to said base, wherein each lug includes a stem portion that extends through said slot and a head portion that is receivable between said substantially planar portion of said lug mount and said base.

17. The tool mounting system stated in claim 16, wherein said at least one tool mounting structure comprises:
a tool rail.

18. The tool mounting system stated in claim 16, further comprising:
said mount plug and said lug connected to each of said at least one tool mounting structure at a predetermined distance that is different for each of said at least one tool mounting structures so that only a desired said at least one tool mounting structure can be releasably connectable to said base.

19. The tool mounting system stated in claim 16, further comprising:
said stem portion of each said lug having a predetermined diameter releasably engageable with said slot of said lug mount wherein said slot has a width corresponding to said diameter of said stem portion so that the proper at least one tool mounting structure is releasably connectable to said base.

20. The tool mounting system stated in claim 16, further comprising:
said lug shaded a unique predetermined color and releasably connectable to a lug mount shaded in a similar color so as to identify said at least one tooling mounting structure to be releasably connectable to said base.

* * * * *

UNITED STATES PATENT AND TRADEMARK OFFICE
CERTIFICATE OF CORRECTION

PATENT NO.         : 8,024,852 B1
APPLICATION NO.    : 12/823385
DATED              : September 27, 2011
INVENTOR(S)        : Hurst et al.

It is certified that error appears in the above-identified patent and that said Letters Patent is hereby corrected as shown below:

In Col. 1, line 60, please delete "have" and insert --has--;

In Col. 1, line 67, please delete "is" and insert --are--;

In Col. 2, line 34, please delete "1, workpiece" and insert --1, the workpiece--;

In Col. 2, line 41, please delete "example mechanical" and insert --example, mechanical--;

In Col. 3, line 47, please delete "in" and insert --is--;

In Col. 4, line 42, please delete "42 from" and insert --42, from--;

In Col. 4, line 61, please delete "assure" and insert --ensure--; and

In Col. 7, line 19, please delete "releas ably" and insert --releasably--.

Signed and Sealed this
Sixth Day of December, 2011

David J. Kappos
*Director of the United States Patent and Trademark Office*